3,201,380
PROCESS FOR THE PRODUCTION OF POLYETHYLENE
Georg Schmidt-Thomée, Heidelberg, Hans Eilbracht, Klaus Kinkel, and Hans Georg Trieschmann, Ludwigshafen (Rhine), Friedrich Urban, Limburgerhof, Pfalz, and Guenter Zoche, Ludwigshafen (Rhine), Germany, assignors to Badische Anilin- & Soda-Fabrik Aktiengesellschaft, Ludwigshafen (Rhine), Germany
No Drawing. Filed Sept. 12, 1961, Ser. No. 137,536
Claims priority, application Germany, Sept. 16, 1960, B 59,393
3 Claims. (Cl. 260—94.9)

This invention relates to a process for the production of polyethylene. In particular it relates to a process for the production of polyethylene under high pressures in which oxygen is used as catalyst and hydrogen is used as regulator.

In the polymerization of ethylene to polyethylene at high pressures with oxygen as catalyst, a polyethylene is obtained with a density of 0.918 to 0.920. This polyethylene is especially well suited to the production of films. The films are clear and transparent and have an excellent shock resistance and tensile strength, which are important for use in the packaging field. Polythylene of the density 0.918 to 0.920 has only moderate stiffness, however, and films prepared therefrom, especially when they are very thin, are often too soft and flexible to be processed on automatic processing machines, for example automatic welding, packaging or printing machines.

It is known that the stiffness of polyethylene increases with increasing density. For the said requirements, for example, polyethylene of the density 0.925 to 0.926 has adequate stiffness. Numerous processes are known for the production of high pressure polyethylene with increased density. These processes are mainly based on the use of catalysts other than oxygen, especially radical-forming compounds, such as peroxides, azo compounds and the like. Films prepared from such a polyethylene have the required stiffness and are easy to process. They are not satisfactory, however, because they either do not have the same clarity and transparency as a material of the density 0.918 to 0.920 and/or they no longer have satisfactory tensile strength. The advantage of the increased stiffness is greatly impaired by this disadvantage.

It is an object of the present invention to provide a process for the polymerization of ethylene according to which ethylene is polymerized in the conventional way at high pressure and densities above 0.924 are obtained. Another object of the invention is the production of polyethylene which is especially suitable for processing into films which have high clarity and transparency.

We have found that a polyethylene with a density above 0.924 is obtained which can be processed into films with high clarity and transparency by polymerizing ethylene in a tubular polymerization system in the presence of oxygen as catalyst and in the presence of hydrogen but in the absence of solvents or diluents, at pressures between 2000 and 4000, preferably 2000 and 2500 atmospheres gauge and temperatures between 200° and 300° C., preferably between 220° and 280° C., the ethylene containing 0.05 to 0.2% by weight by hydrogen and the amount of oxygen being 5 to 20 p.p.m. with reference to ethylene.

It is known to polymerize ethylene continuously under high pressure in the presence of oxygen as catalyst and in the presence of small amounts of hydrogen. The hydrogen should amount to about 2 to 3% volume with reference to ethylene in the said known process, whereas 500 atmospheres gauge or more is specified as pressure. In this known process, polymers are obtained with a density of 0.918 to 0.920. It is therefore very surprising that polyethylene with a density of 0.925 to 0.928 should be obtained by working according to the present invention.

If the new process, as above described, is carried out in the presence of 0.05 to 0.2% by weight of hydrogen and a maximum of 20 p.p.m. of oxygen, with reference to ethylene, but at 1500 atmospheres gauge, the production lies at only about 50% as compared with polymerization without hydrogen. Blown films prepared from such a product moreover do not satisfy the above mentioned requirements as to clarity. It is surprising that by raising the pressure to 2000 atmospheres gauge or more, the production would be increased to 90 to 120% as compared with polymerization without hydrogen, which represents a considerably higher rise in the conversion than corresponds to the increase in the monomer concentration by the change in pressure. At the same time, however, at a pressure above 2000 atmosphere gauge, the clarity of a film prepared from such a material is so considerably improved that the films outstandingly satisfy the high requirements specified above. Additionally, such films have an excellent blocking behavior. The following table gives the relationship between pressure, production and clarity:

| Pressure in atmospheres gauge | Parts by weight of polyethylene per 1,000 parts of ethylene | Scatter fraction in percent [1] | |
|---|---|---|---|
| | | Raw material | After kneading in a rubber kneader |
| 1,500 | 55 | 95.8 | 31.0 |
| 1,600 | 62 | 94.4 | |
| 1,700 | 68 | 93.0 | 25.7 |
| 1,800 | 74 | 92.0 | |
| 1,900 | 78 | 89.3 | 19.4 |
| 2,000 | 88 | 82.4 | |
| 2,100 | 99 | 68.3 | 14.7 |
| 2,200 | 113 | 49.9 | 13.2 |
| 2,300 | 135 | 44.0 | 12.6 |
| Comparative experiment without hydrogen | | | |
| 1,500 | 120 | 65 | 30 |

[1] Scatter fraction is a measure of the clarity and represents the fraction of the scattered light in percent of the transmitted light from a parallel beam of light, measured with a photo element in an Ulbricht sphere.

The process according to the present invention, as compared with the known processes for the production of high pressure polyethylene with an increased density, is characterized by special simplicity. No sensitive catalysts which are difficult to handle are used, no solvents for these catalysts are required and consequently no apparatus for adding the catalyst solution at high pressures or apparatus for separating such solvent.

The process constitutes a considerable advance in the production of polyethylene suitable for high-quality films.

The following example illustrates, but does not limit, the invention. Parts are parts by weight, unless otherwise stated.

*Example*

A mixture of 1000 parts per hour of ethylene and 0.85 part of hydrogen, which contains 12 p.p.m. of oxygen, is compressed to a pressure of 2300 atmospheres gauge and passed continuously through a tubular reaction system heated to 200° C. At the end of the reaction system, the product is continuously expanded, the polyethylene formed separated from unreacted gas, this gas brought to the initial concentration by addition of hydrogen and oxygen, compressed and returned to the reaction. 135 parts per hour of polyethylene is obtained with the grader number 1.6 and the density 0.926. A blown film prepared from this polyethylene after kneading in a rubber kneader has a scatter fraction of 12.6%.

Under conditions otherwise the same but with the reaction pressure, reaction temperature and the amounts of hydrogen and oxygen varied, as shown, within the specified ranges, the results summarized in the following table are obtained:

| Reaction Pressure | Reaction temperature, °C. | Parts of $H_2$ | $O_2$, p.p.m. (vol.) | Parts of polyethylene | Grader number | Density |
|---|---|---|---|---|---|---|
| 2,000 | 240 | 1.15 | 19 | 88 | 1.4 | 0.926 |
| 2,100 | 250 | 1.10 | 17 | 99 | 1.5 | 0.925 |
| 2,100 | 250 | 0.95 | 16 | 107 | 4.0 | 0.925 |
| 2,100 | 240 | 1.22 | 14 | 90 | 1.7 | 0.928 |
| 2,200 | 260 | 0.88 | 14 | 113 | 1.5 | 0.926 |
| 2,300 | 280 | 0.85 | 12 | 135 | 1.6 | 0.926 |

It is therefore possible according to the present process to obtain polyethylene with densities up to 0.928.

We claim:

1. A process for the production of polyethylene having a density above 0.924 which comprises polymerizing ethylene in the absence of solvents at a pressure between 2000 and 4000 atmospheres and a temperature between 200° C. and 300° C. in the presence of 0.05 to 0.2 percent by weight, with reference to the ethylene, of hydrogen as regulator and 5–20 p.p.m. of $O_2$, based on the ethylene as the sole catalyst, and recovering polyethylene having a density above 0.924, said polyethylene being adapted for processing into films with high clarity and transparency.

2. A process as claimed in claim 1 wherein said pressure is between 2000 and 2500 atmospheres and said temperature is between 220° C. and 280° C.

3. A process for the production of polyethylene having a density above 0.924 which comprises reacting a mixture consisting essentially of ethylene, 0.05 to 0.2 percent by weight, based on the ethylene, of hydrogen as the regulator and 5–20 p.p.m., based on the ethylene, of $O_2$ as the sole catalyst at a temperature between 200° C. and 400° C. and a pressure between 2000 and 4000 atmospheres, and recovering polyethylene having a density above 0.924, said polyethylene being adapted for processing into films with high clarity and transparency.

References Cited by the Examiner

UNITED STATES PATENTS 2,387,755  3/43  Hanford _____ 260—94.9
2,865,903  2/56  Seed _____ 260—94.9

OTHER REFERENCES

Raff et al.: Polyethylene, Interscience Publishers Inc., New York, London (1956) (pages 49–54 relied upon).

JOSEPH L. SCHOFER, *Primary Examiner.*